United States Patent
Phillips et al.

(10) Patent No.: US 6,332,062 B1
(45) Date of Patent: Dec. 18, 2001

(54) SYSTEMS AND METHODS FOR CUSTOMIZING USER MESSAGES IN A PRINTING SYSTEM

(75) Inventors: Quintin T. Phillips; Robert E. Haines; Mary B. Baumunk; Jake Heusinkveld, all of Boise; Darius Boockholdt, Eagle, all of ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/479,957

(22) Filed: Jan. 10, 2000

Related U.S. Application Data

(63) Continuation-in-part of application No. 09/410,989, filed on Oct. 1, 1999.

(51) Int. Cl.[7] .......................... G03G 15/00; G03G 15/08
(52) U.S. Cl. .................... 399/12; 399/24; 399/81
(58) Field of Search ................ 399/24, 25, 27, 399/29, 12, 81

(56) References Cited

U.S. PATENT DOCUMENTS

| | | | |
|---|---|---|---|
| 4,961,088 | * 10/1990 | Gilliland et al. | 399/25 |
| 5,272,503 | * 12/1993 | Le Sueur et al. | 399/25 |
| 5,283,613 | * 2/1994 | Midgley | 399/9 |
| 5,491,540 | * 2/1996 | Hirst | 399/12 |
| 5,572,292 | * 11/1996 | Chatani et al. | 399/25 |
| 5,699,091 | * 12/1997 | Bullock et al. | 399/24 X |
| 5,826,134 | * 10/1998 | Hino et al. | 399/27 |
| 5,835,817 | * 11/1998 | Bullock et al. | 399/25 |
| 5,930,553 | * 7/1999 | Hirst et al. | 399/24 X |

* cited by examiner

*Primary Examiner*—Fred L. Braun

(57) ABSTRACT

Systems and methods are described that allow customization of user messages in a printing system. A printing device includes a replaceable component that includes component memory. First and second message data are stored in the component memory, the message data being message text or a pointer to message text. If the message data is a pointer to message text, the message text is stored in printing device memory, in memory of a host computer or on a remote site accessible via a host computer. A first message is displayed to a user in response to detection of a first event. A second message is displayed to the user in response to detection of a second event. If the message data are pointers to message text external to the printing device, an entity delivering the messages can change the message text without reconfiguring the printing device.

26 Claims, 5 Drawing Sheets

SYSTEMS AND METHODS FOR CUSTOMIZING USER MESSAGES IN A PRINTING SYSTEM

CROSS REFERENCE TO RELATED APPLICATIONS

This application is a continuation in part of co-pending U.S. application Ser. No. 09/410,989 filed Oct. 1, 1999.

TECHNICAL FIELD

This invention generally relates to replaceable components installable into printing devices, and more particularly, to printing device components having a memory.

BACKGROUND

Most types of printing devices are equipped with replaceable components that have a life cycle during which the replaceable components are functional. Such replaceable components include toner cartridges, ink cartridges, fusers, drums, etc. At the end of the life cycle of a replaceable component, the component must be replaced for the printing device to continue to function properly. Typically, a new replaceable component is ordered from a vendor to replace the component currently being used.

For example, a toner cartridge is installed in a laser printer to provide toner for the printing process. As documents are printed, the toner supply is gradually depleted. When the toner supply is completely exhausted, the printer cannot print any further documents until the toner cartridge is replaced. At this time, a replacement toner cartridge must be ordered from a toner cartridge vendor to replace the used toner cartridge.

A printer user has many toner cartridge vendors from which to choose when purchasing a toner cartridge to replace a depleted toner cartridge. Not only can the user purchase a toner cartridge from the printer manufacturer or an authorized reseller, but there are toner cartridges available from many vendors who remanufacture toner cartridges. Remanufacturing toner cartridges consists of taking a depleted toner cartridge and restoring it by replenishing the toner supply and replacing some deteriorated parts.

Because of the competitive nature of the market for toner cartridges, manufacturers, resellers and remanufacturers seek any opportunity to reach printer users with advertisements for their products and services. Many advertising avenues are used by vendors to advertise to potential customers. Vendors place advertisements in catalogues, magazines, trade journals, etc. Unfortunately, these advertising avenues only reach a small percentage of the target audience. In addition, the advertisements may be included with similar advertisements by competitors, which can diminish the effect of the advertisement.

Toner cartridges and other replaceable printer components can be manufactured with memory which can be placed on the cartridge itself or within a label affixed to the cartridge. This memory is typically used to store printer-related data that the printer reads to determine various printing parameters. For example, the memory may store the model number of the cartridge so that the printer may recognize the cartridge as valid or invalid for use with that printer. The present invention contemplates utilizing this memory to provide direct messaging to printer users.

SUMMARY

Toner cartridges and other replaceable printer components can be equipped with a memory. This memory can be utilized to provide direct messaging to a printer user which affords the manufacturer of the replaceable component an excellent opportunity to reach every customer directly and greatly increases the likelihood of retaining the customer's business. One-time messaging, however, is inflexible and provides only a single message which is delivered to the user at one given time.

The present invention contemplates a printing system that provides dynamic messaging to printing device users by storing user message data in memory located on a replaceable component that is installable into the printing device. Multiple user messages are displayed to the user based on the occurrence of predetermined and/or user-determined trigger events.

This memory may also be utilized by a vendor to store the vendor's telephone number or Universal Resource Locator (URL) so the vendor can be automatically contacted by the user. This is not only a convenience for the user, but it provides the vendor that sold the toner cartridge to the user with an excellent advantage over competitors in marketing subsequent toner cartridges to the user.

The present invention contemplates utilizing such memory to store user message data from which multiple user messages may be derived upon the occurrence of certain trigger events. The trigger events may be predefined events designated at the time of manufacture, or they may be designated at a later time by the user or a vendor. The user message data may comprise the complete electronic representation of the messages. Alternatively, the user message data may comprise message identifiers that identify various messages that are stored in memory external to the cartridge, such as in the printing device or at a website on the Internet.

For example, a first user message may be designed to be displayed to the user when the replaceable component is initially installed, and a second user message may be designed to be displayed to the user when the replaceable component is nearing the end of its functional life cycle. The actual messages may be contained the component memory or in a table in printer memory. A first message is stored on the component memory, or a first message identifier is stored on the component memory and corresponds to the first user message in memory external to the component. A second message is stored on the component memory, or a second message identifier is stored on the component memory and corresponds to the second user message in memory external to the component.

When the replaceable component is initially installed, a detector detects that installation as the trigger event for the first user message. The first user message is retrieved and is displayed to the user. When the second trigger event is detected, the second user message is retrieved and is displayed to the user.

BRIEF DESCRIPTION OF THE DRAWINGS

The present invention is illustrated by way of example and not limited by the figures of the accompanying drawings. The same numbers are used throughout the figures to reference like components and/or features.

DETAILED DESCRIPTION

Figure 1:
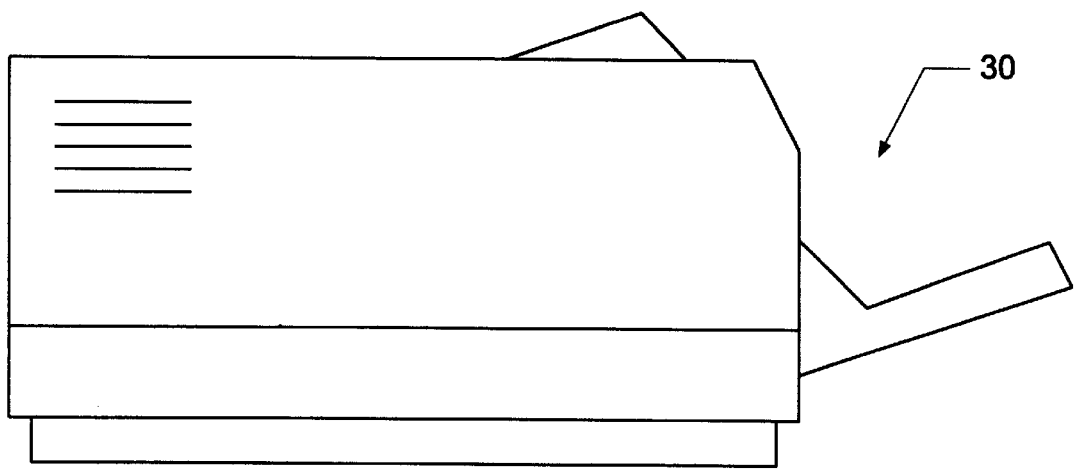
FIG. 1 is a diagrammatic illustration of a laser printer.

FIG. 1 is a diagrammatic illustration of a laser printer 30 in which the present invention may be implemented. The invention may further be implemented in other units that employ printing devices, such as scanners, photocopiers, facsimile machines, and the like. For purposes of discussion, the invention is described in the context of laser printers.

Figure 2:
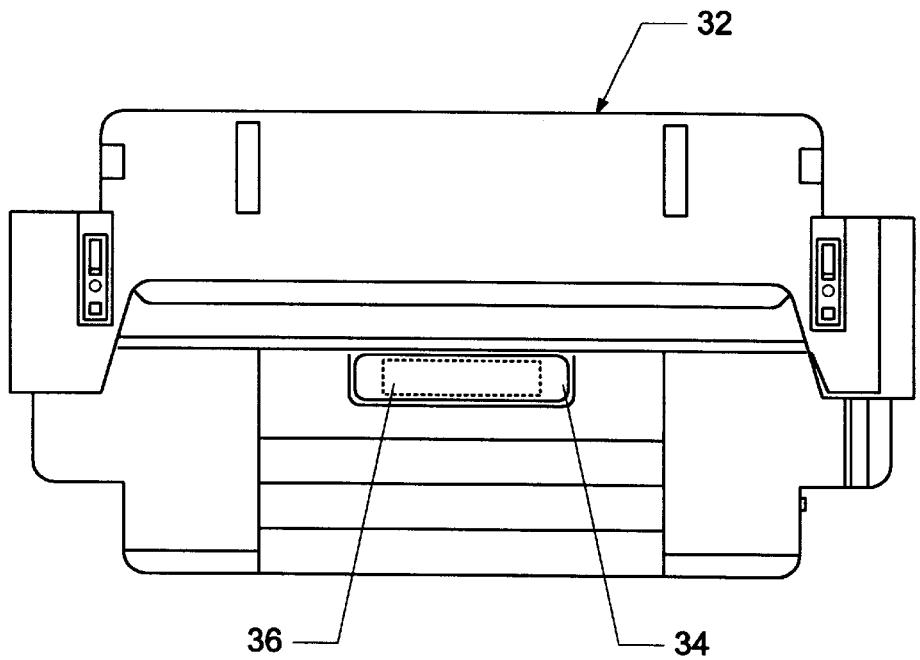
FIG. 2 is a diagrammatic illustration of a laser printer toner cartridge.

FIG. 2 shows a toner cartridge 32 that is installable in the laser printer 30. The toner cartridge 32 has a label 34 that contains information identifying the toner cartridge 32 to a user. The label 34 typically recites the name of the manufacturer, the model number of the cartridge, etc. Although the invention is shown and described herein embodied as a printer toner cartridge for a laser printer, it is noted that the invention may be embodied as any replaceable component (toner cartridge, ink cartridge, fuser, drum, etc.) installable in a printing device (printer, copier, fax machine, etc.).

A memory tag 36 is located underneath the label 34 on the toner cartridge 32, although the memory tag 36 may be placed on the toner cartridge 32 at any location which may be practical for the purposes described herein. The memory tag 36 is preferably a radio frequency identification (RFID) memory tag. RFID memory tags and applications therefor are well known in the art. Further aspects of the RFID memory tag 36 structure and its functionality in the present invention will become more clear as the discussion progresses.

Figure 3:
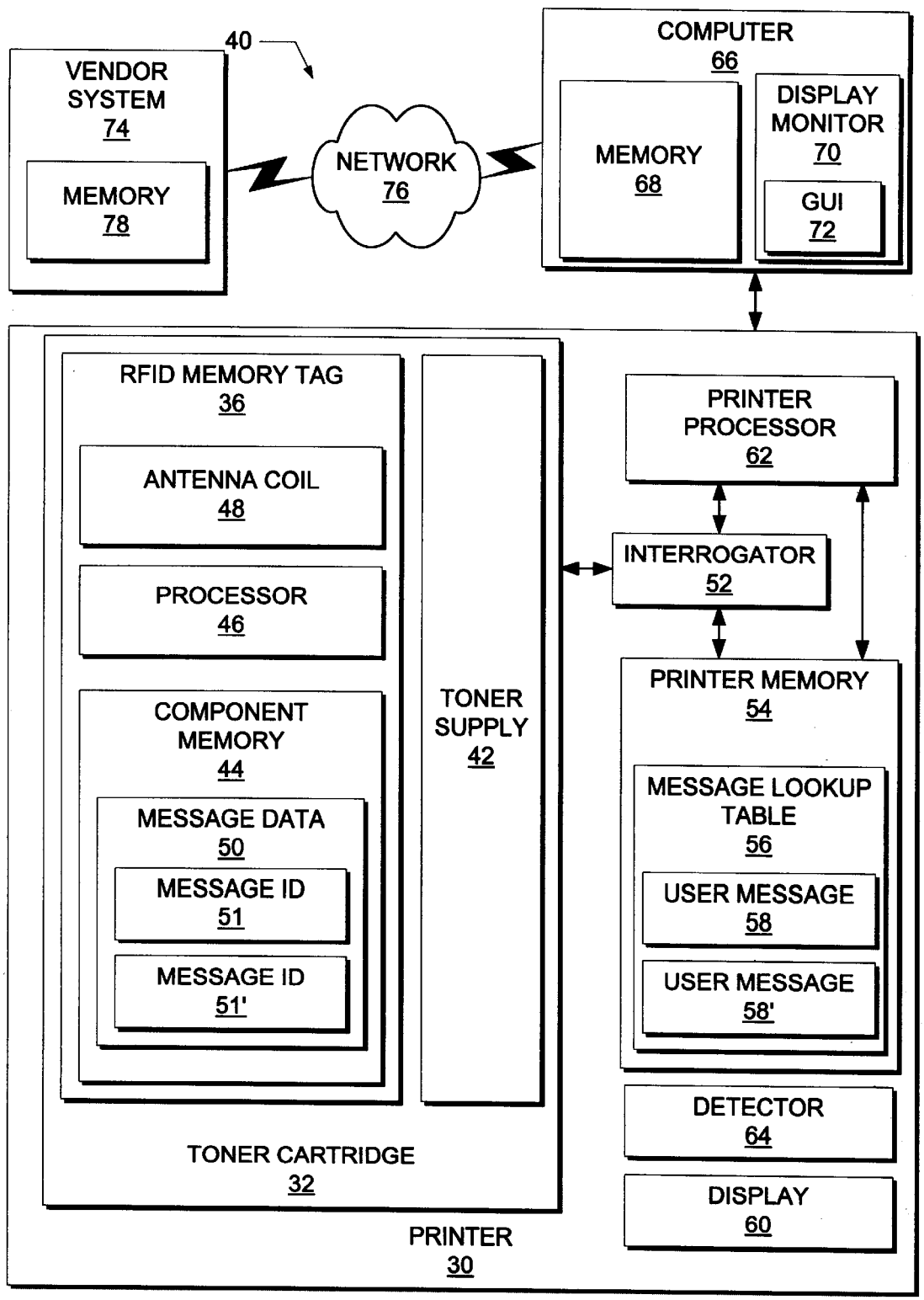
FIG. 3 is a block diagram of a printing system.

FIG. 3 is a block diagram of printing system 40 that includes the printer 30 which has the toner cartridge 32 installed therein, and which may be removed and replaced by another toner cartridge (not shown). The toner cartridge 32 includes the memory tag 36 and a toner supply 42.

As previously stated, the memory tag 36 is an RFID memory tag, although it is noted that the memory tag 36 may be conventional semiconductor memory. The RFID memory tag 36 has component memory 44, a processor 46, and an antenna coil 48. The component memory 44 has message data 50 stored therein comprising message identifiers 51, 51'. The format and function of the message data 50 will be described in further detail below.

The RFID memory tag 36 is designed to operate in conjunction with an interrogating device, also known as an interrogator. An interrogator is a device that provides power to, reads from and/or writes to the memory tag 36. Examples of interrogators include a memory tag reader or scanner, a memory tag writing device which stores data on the memory tag 36, and the like. In the present example, the laser printer 30 includes an interrogator 52.

The interrogator 52 emits a radio frequency field that provides power to the memory tag 36 via the antenna coil 48. The memory tag 36, therefore, does not require its own power supply, a feature that adds to the cost efficiency and practicality of utilizing RFID memory for the memory tag 36.

Communications between the interrogator 52 and the RFID memory tag 36 are transmitted and received via the radio frequency field and the antenna coil 48 utilizing standard RFID method and protocol, such as promulgated in ISO 14443 and ISO 15693. Therefore, physical contact between the memory tag 36 and the printer 30 is not required for the printer 30 to communicate with the memory tag 36.

The toner cartridge 32 communicates with the printer 30, which includes printer memory 54. The printer memory 54 contains a message lookup table 56 that contains user messages 58, 58' to be displayed to the printer user. As will be discussed in greater detail below, user messages 58, 58' correspond to the message identifiers 51, 51' comprising the message data 50.

The printer 30 also comprises a display 60 and a printer processor 62. A detector 64 is located in the printer 30 and is configured to detect the occurrence of multiple trigger events that occur with the printer 30. The detector 64 is also configured to correlate a message identifier 51, 51' with a trigger event. A trigger event may be predefined by the manufacturer, such as when the toner cartridge 32 is initially installed into the printer 30. A trigger event may also be a user or vendor defined event, such as activation of a toner low signal for the toner cartridge 32, or printing a certain number of pages from the toner cartridge 32.

A trigger event may be any type of event detectable by the printer 30. For example, trigger events may include: when a certain user uses the printer; when the printer user changes from one user to another; when certain print jobs are printed; specific times (e.g., twenty days after the toner cartridge 32 is installed); and a specific number of pages (e.g., 500 pages after the toner cartridge 32 is installed).

The printer 30 is connected to a computer 66 which comprises memory 68 and a display monitor 70. A graphical user interface (GUI) 72 is displayed on the display monitor 70 to provide visual information to the user. The memory 68 of the computer 66 may contain the message lookup table 56.

The computer 66 is connected to a vendor system 74 via a network 76, such as the Internet, a local area network (LAN), a wide area network (WAN), or the like. The vendor system 74 comprises memory 78, which may contain the message lookup table 56.

It is also noted that although the functional components of the printing system 40 are shown in specific locations, the functional components may be located on the printer 30, the toner cartridge 32, the computer 66, or the vendor system 74 provided the functionality of the printing system 40 is preserved.

Figure 4:
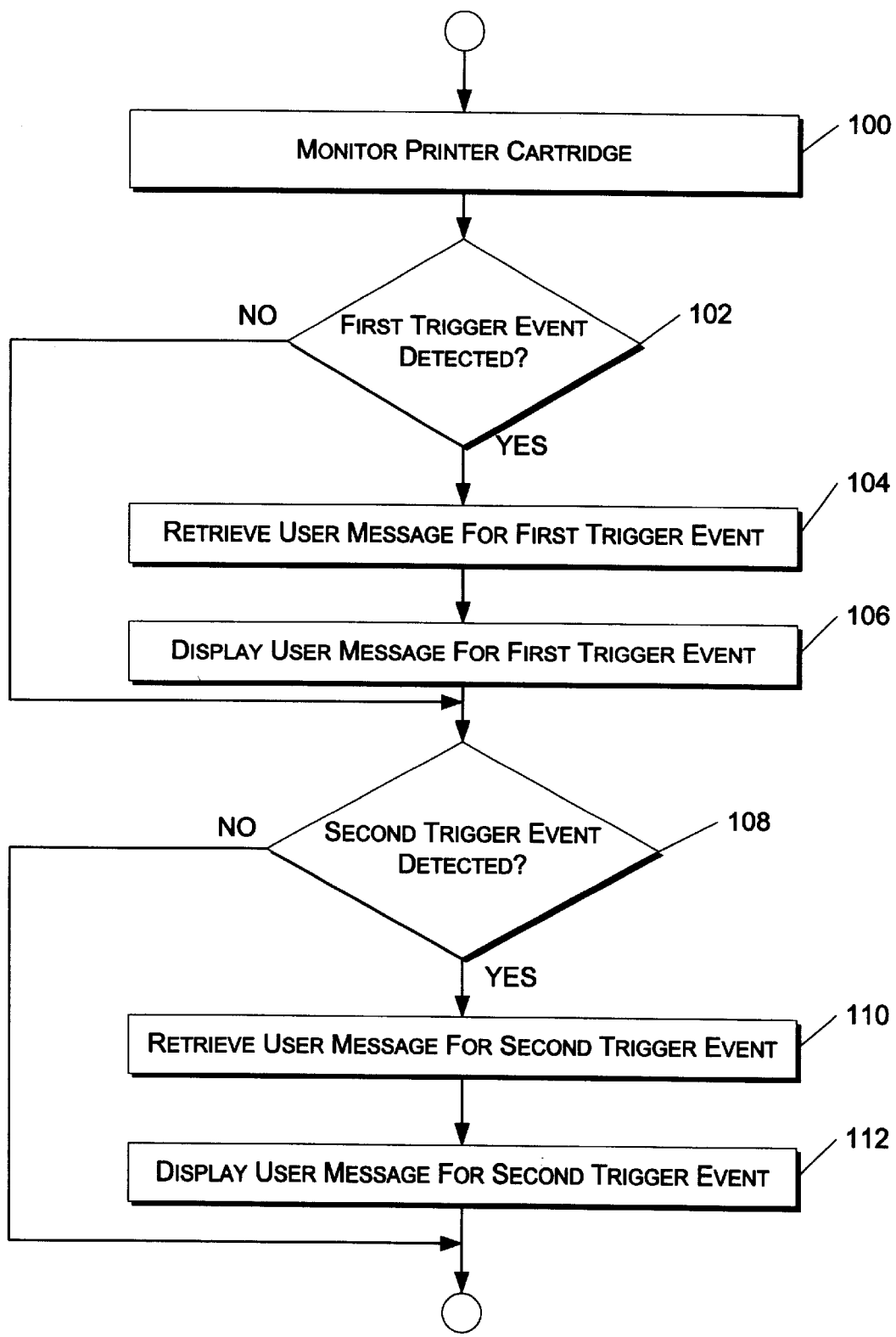
FIG. 4 is a flow diagram of a dynamic messaging process utilizing memory in printer components.

FIG. 4 depicts a flow diagram of a dynamic messaging process utilizing the RFID memory tag 36 in the toner cartridge 32. At step 100, the detector 64 monitors the toner cartridge 32 for an occurrence of a first trigger event. For discussion purposes, the first trigger event will be when the toner cartridge 32 is initially installed in the printer 30.

Step 100 shows that the printer cartridge 32 is continuously monitored by the detector 64 for an occurrence of the first trigger event, the installation of the toner cartridge 32. As shown at step 102, when the toner cartridge 32 installation is detected, the detector 64 is configured to retrieve the first user message 58 that corresponds to the first trigger event (step 104). This can be accomplished in different ways, which will be explained in detail below with reference to FIG. 5 and FIG. 6.

Once the detector 64 has retrieved the first user message 58 in response to the first trigger event, the first user message 58 is displayed to the user on the display 60 of the printer 30 at step 106. Alternatively, the first user message 58 may be passed to the computer 66 for display on the graphical user interface 72 of the display monitor 70.

The detector 64 continues to monitor the printer cartridge 32 for an occurrence of the second trigger event, the activation of a toner low signal. As shown at step 108, when the toner low signal is detected, the detector 64 is configured to retrieve the second user message 58' that corresponds to the second trigger event (step 110). Again, this can be accomplished in different ways which will be explained in detail below.

Once the detector 64 has retrieved the second user message 58' in response to the second trigger event, the second user message 58' is displayed to the user on the display 60 of the printer 30 at step 112. Alternatively, the second user message 58' may be passed to the computer 66 for display on the graphical user interface 72 of the display monitor 70.

Figure 5:
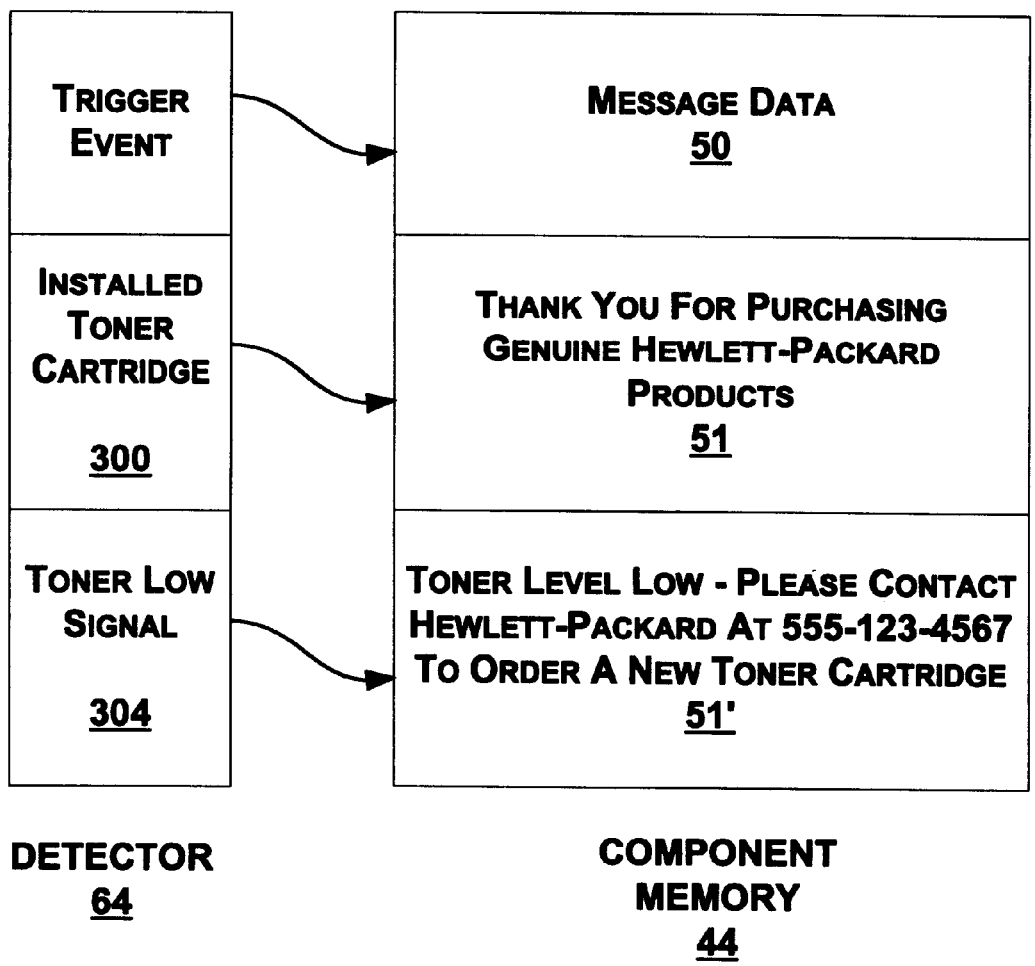
FIG. 5 is a diagram of a messaging process that stores user messages on component memory.

As stated previously, there are different ways that the detector 64 may retrieve the user messages 58, 58'. FIG. 5 shows that one way to accomplish this is to store the user messages 58, 58' as the message identifiers 51, 51' in the message data 50 of the component memory 44 as shown in FIG. 5. This can be accomplished if the component memory 44 is of sufficient size to contain the complete electronic representations of the user messages 58, 58'. The detector 64 is configured to retrieve a message identifier 51 from a specific memory location upon the occurrence of the first trigger event.

The detector 64 is configured to detect a first trigger event ('Installed Toner Cartridge, 300) when the toner cartridge 32 is installed into the printer 30. When the detector 64 detects the installation, the detector 64 is configured to read message identifier 51 from the message data 50 of the component memory 44. The message identifier 51 in this instance is the user message "Thank You For Purchasing Genuine Hewlett-Packard Products." This message is then displayed to the user by any of the methods described above.

The detector 64 is also configured to detect a second trigger event ('Toner Low Signal, 304). When the toner low signal is activated, the detector 64 is configured to read message identifier 51' from the message data 50 of the component memory 44. The message identifier 51' is the user message "Toner Level Low—Please Contact Hewlett-Packard At 555-123-4567 To Order A New Toner Cartridge." This message is then displayed to the user by any of the methods described above.

Since it is likely that the component memory 44 will not have the capacity to store more than one user message in its complete form, another way that the detector 64 can retrieve user messages 58, 58' to display to the user is to store the actual user messages 58, 58' in memory external to the toner cartridge 32, as illustrated in FIG. 3. In the present example, the user messages 58, 58' are stored in the message lookup table 56 in the printer memory 54. When the user messages 58, 58' are stored external to the toner cartridge 32, the message data 50 comprises message identifiers 51, 51', which correspond to the user messages 58, 58', respectively, in the message lookup table 56. The detector 64 utilizes the contents of the message identifier 51 for the first trigger event to locate the user message 58 to be displayed in response to the first trigger event.

Figure 6:
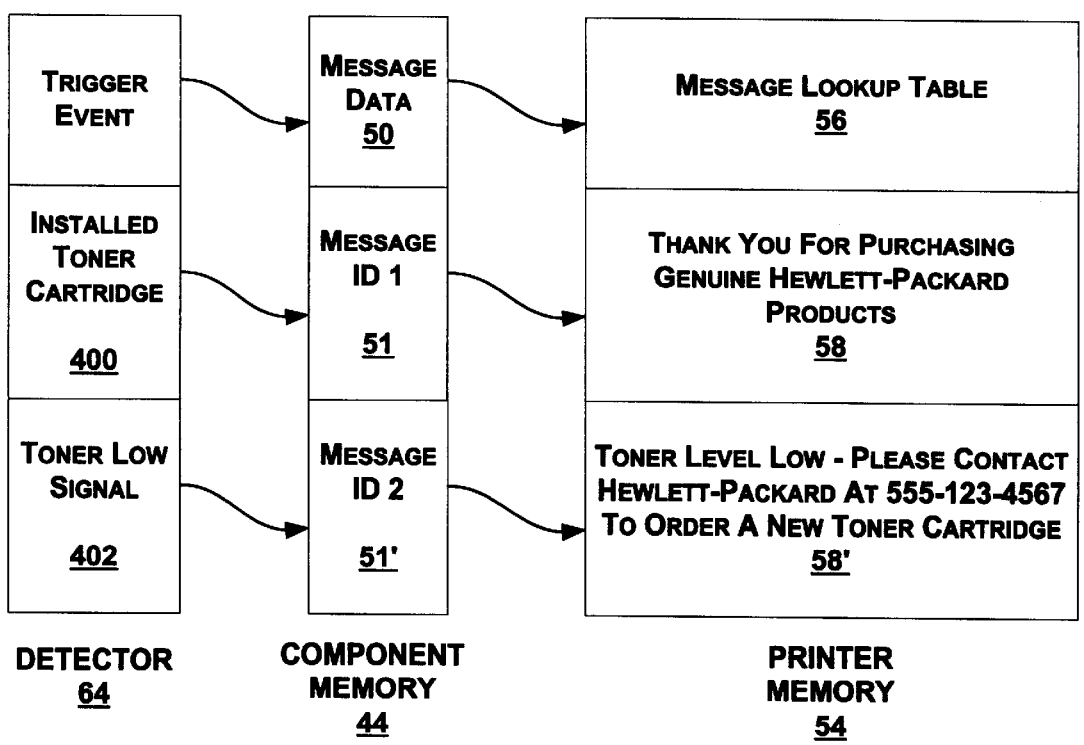
FIG. 6 is a diagram of a messaging process that stores user messages in memory external to the component.

FIG. 6 depicts the configuration used in this example. The detector 64 is configured to detect the occurrence of the first trigger event, installation of the toner cartridge 32 into the printer 30. When the toner cartridge 32 is installed 400, the detector 64 is configured to read message identifier 51 from the message data 50 in the component memory 44. Message identifier 51 points to an entry in the message lookup table 56 in the printer memory 54 that contains user message 58. User message 58 is the message "Thank You For Purchasing Genuine Hewlett-Packard Products." User message 58 is then displayed to the user via the printer display 60, or the GUI 72 of the display monitor 70 of the computer 66.

Similarly, the detector 64 is configured to detect the occurrence of the second trigger event, activation of the toner low signal. When the toner low signal is activated 402, the detector 64 is configured to read message identifier 51' from the message data 50 in the component memory 44. Message identifier 51' points to an entry in the message lookup table 56 in the printer memory 54 that contains user message 58'. User message 58' is the message "Toner Level Low—Please Contact Hewlett-Packard At 555-123-4567 To Order A New Toner Cartridge." User message 58' is then displayed to the user via either of the methods described above.

It is noted that if the message lookup table 56 is contained in the memory 68 of the computer 66 connected to the printer 30, the process is similar to that described above, except that the printer 30 must communicate with the computer to retrieve the user messages 58, 58'.

Similarly, if the message lookup table 56 is contained in the memory 78 of the vendor system 74, the printer must communicate with the vendor system to access the user messages 58, 58'. As shown, the communication is made over a network such as the Internet. In this case, the printer must first establish contact with the vendor system 74 through the network, either independently or through the computer 66. An advantage to maintaining the user messages 58, 58' on the vendor system 74 is that the vendor may then maintain control over the content of the user messages 58, 58' and the system is more flexible because the vendor has the control to alter the user messages 58, 58' at any time.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. In a printing device having memory and using a replaceable component with integrated component memory, a method comprising:

detecting a first trigger event;

retrieving a first message identifier from the component memory;

accessing a message lookup table that contains a plurality of user messages;

locating a first user message in the message lookup table, the first user message corresponding to the first message identifier;

displaying the first user message via a user interface;

detecting a second trigger event;

retrieving a second message identifier from the component memory;

accessing the message lookup table;

locating a second user message in the message lookup table, the second user message corresponding to the second message identifier;

displaying the second user message via the user interface; and wherein the first message identifier and the second message identifier include information that identifies a location of the message lookup table.

2. The method recited in claim 1 wherein the information that references a location of the message lookup table further comprises a memory address in the memory of the printing device.

3. The method recited in claim 1 wherein the information that references a location of the message lookup table is a Universal Resource Locator (URL) that identifies an Internet site where the message lookup table is stored.

4. The method recited in claim 1 wherein the first trigger event comprises use of the printing device by a first user, and the second trigger event comprises use of the printing device by a second user.

5. The method recited in claim 1 wherein the first trigger event comprises a first print job, and the second trigger event comprises a second print job.

6. The method recited in claim 1 wherein the first trigger event comprises a first time, and the second trigger event comprises a later second time.

7. The method recited in claim 1 wherein the information that references a location of the message lookup table is a telephone number of a remote site where the message lookup table is stored.

8. A printing system comprising:
   a printing device having a replaceable component with component memory integrated therein, the component memory storing a first message identifier and a second message identifier;
   memory located outside the replaceable component that stores a message lookup table. the message lookup table containing a plurality of alterable user messages;
   a user interface; and
   a processor configured to:
      retrieve the first message identifier in response to a first trigger event;
      access a first user message in the message lookup table, the first user message corresponding to the first message identifier;
      display the first user message;
      retrieve the second message identifier in response to a second trigger event;
      access a second user message in the message lookup table, the second user message corresponding to the second message identifier; and
      display the second user message.

9. The printing system recited in claim 8 wherein the memory is located in the printing device.

10. The printing system recited in claim 8 wherein the message lookup table is stored external to the printing device.

11. The printing system recited in claim 8, further comprising a host computer connected to the printing device, and wherein the memory is located in the host computer.

12. The printing system recited in claim 8 wherein the first user message, the second user message, or both further comprise advertisements.

13. The printing system recited in claim 8, further comprising a host computer connected to the printing device, and wherein:
   the host computer networks with a vendor system; and
   the memory is located in the vendor system.

14. The printing system recited in claim 8 wherein the trigger events are selected from a group of trigger events comprising:
   (a) use of the printing device by one or more users;
   (b) print jobs;
   (c) replaceable component installation;
   (d) time since the replaceable component was installed;
   (e) time since the replaceable component was manufactured; and
   (f) number of pages printed utilizing the replaceable component.

15. The printing system recited in claim 8 wherein the component memory comprises radio frequency identification (RFID) memory.

16. A laser printer toner cartridge comprising:
   cartridge memory;
   a first message identifier stored in the cartridge memory, the first message identifier uniquely identifying a first user message stored in a message lookup table having a plurality of user messages stored therein;
   a second message identifier stored in the cartridge memory the second message identifier uniquely identifying a second user message stored in the message lookup table;
   wherein:
      the first message identifier is invoked by a laser printer device in which the toner cartridge is installed in response to a first trigger event;
      the first user message is located and displayed using the first message identifier;
      the second message identifier is invoked by the laser printer in response to a second trigger event;
      the second user message is located and displayed using the second message identifier.

17. The toner cartridge recited in claim 16 wherein the cartridge memory further stores a location of the message lookup table.

18. The toner cartridge recited in claim 17, wherein the location of the message lookup table is identified by a Universal Resource Locator (URL) stored in the cartridge memory.

19. The toner cartridge recited in claim 17, wherein the location of the message lookup table is identified by a telephone number stored in the cartridge memory, the telephone number being an access number to a remote computer.

20. The toner cartridge recited in claim 17, wherein the location of the message lookup table is identified by a printer memory address stored in the cartridge memory.

21. The toner cartridge recited in claim 16 wherein the cartridge memory comprises radio frequency identification (RFID) memory.

22. A printing device replaceable component, comprising:
   component memory;
   a first message identifier stored in the component memory, the first message identifier uniquely identifying a first user message stored in a message lookup table having a plurality of user messages stored therein;
   a second message identifier stored in the component memory the second message identifier uniquely identifying a second user message stored in the message lookup table;
   wherein:
      the first message identifier is invoked by a laser printer device in which the replaceable component is installed in response to a first trigger event;
      the first user message is located and displayed using the first message identifier;
      the second message identifier is invoked by the laser printer in response to a second trigger event;
      the second user message is located and displayed using the second message identifier.

23. The printing device replaceable component recited in claim 22 the component memory further stores a location of the message lookup table.

24. The printing device replaceable component recited in claim 23 the location of the message lookup table is identified by a Universal Resource Locator (URL) stored in the component memory.

25. The printing device replaceable component recited in claim 23 wherein the location of the message lookup table is identified by a telephone number stored in the component memory, the telephone number being an access number to a remote server.

26. The printing device replaceable component recited in claim 22 wherein the component memory comprises radio frequency identification (RFID) memory.

* * * * *